US012720375B2

(12) United States Patent
Shi et al.

(10) Patent No.: US 12,720,375 B2

(45) Date of Patent: Aug. 25, 2026

(54) PER-RADIO UNIT NEIGHBOR LIST

(71) Applicant: Outdoor Wireless Networks LLC, Richardson, TX (US)

(72) Inventors: Minyan Shi, Bolton, MA (US); Shiva Prakash, Bangalore (IN)

(73) Assignee: Outdoor Wireless Networks LLC, Richardson, TX (US)

( * ) Notice: Subject to any disclaimer, the term of this patent is extended or adjusted under 35 U.S.C. 154(b) by 0 days.

(21) Appl. No.: 18/992,286

(22) PCT Filed: Aug. 4, 2023

(86) PCT No.: PCT/US2023/071662

§ 371 (c)(1),
(2) Date: Jan. 8, 2025

(87) PCT Pub. No.: WO2024/039976

PCT Pub. Date: Feb. 22, 2024

(65) Prior Publication Data

US 2026/0122541 A1 Apr. 30, 2026

Related U.S. Application Data

(60) Provisional application No. 63/398,633, filed on Aug. 17, 2022.

(51) Int. Cl.

*H04B 17/309* (2015.01)
*H04B 17/318* (2015.01)
*H04W 36/00* (2009.01)

(52) U.S. Cl.

CPC ...... *H04W 36/0058* (2018.08); *H04B 17/328* (2023.05); *H04B 17/346* (2023.05); *H04W 36/0022* (2013.01); *H04W 36/00835* (2018.08)

(58) Field of Classification Search

CPC .... H04B 17/30; H04B 17/309; H04B 17/318; H04B 17/328; H04B 17/336;

(Continued)

(56) References Cited

U.S. PATENT DOCUMENTS

2010/0112996 A1 5/2010 Ho et al.
2016/0065338 A1* 3/2016 Kim ...................... H04L 5/0048 370/330

(Continued)

FOREIGN PATENT DOCUMENTS

WO 2024039976 A1 2/2024

OTHER PUBLICATIONS

International Searching Authority, "International Search Report and Written Opinion", dated Nov. 15, 2023, from PCT Application No. PCT/US2023/071662, pp. 1 through 8, Published: WO.

(Continued)

*Primary Examiner* — Matthew W Genack

(74) *Attorney, Agent, or Firm* — Fogg & Powers LLC

(57) ABSTRACT

Cells are designated as neighbor cells to at least one radio unit (RU) in a managed cell based on signal power measurements provided by user equipment served by the at least one radio unit. A list is generated that includes each of the RUs in the managed cell and the neighbor cells that are associated with one or more of the RUs. A wireless system can perform one or more operating functions, including carrier aggregation and intra-inter-frequency handover, inter-RAT handover and IMS Voice/Emergency Call Fallback, based on the generated list.

20 Claims, 7 Drawing Sheets

(58) Field of Classification Search
CPC .. H04B 17/345; H04B 17/346; H04B 17/347; H04W 36/0005; H04W 36/0011; H04W 36/0022; H04W 36/0055; H04W 36/0058; H04W 36/0061; H04W 36/0083; H04W 36/00835
See application file for complete search history.

(56) References Cited

U.S. PATENT DOCUMENTS

| | | | | |
|---|---|---|---|---|
| 2016/0316479 | A1 | 10/2016 | Choi et al. | |
| 2017/0135099 | A1 | 5/2017 | Song et al. | |
| 2017/0202005 | A1 | 7/2017 | Madan et al. | |
| 2017/0359848 | A1* | 12/2017 | Tenny | H04W 36/04 |
| 2018/0034669 | A1 | 2/2018 | Barbieri et al. | |
| 2018/0242160 | A1 | 8/2018 | Morita et al. | |
| 2019/0313295 | A1* | 10/2019 | Xu | H04W 88/10 |
| 2019/0319868 | A1* | 10/2019 | Svennebring | H04W 24/08 |
| 2019/0373495 | A1 | 12/2019 | Ouyang et al. | |
| 2021/0289407 | A1 | 9/2021 | Cheng et al. | |
| 2022/0174577 | A1 | 6/2022 | Raghothaman et al. | |
| 2022/0369182 | A1* | 11/2022 | Gundavelli | H04W 36/00835 |

OTHER PUBLICATIONS

European Patent Office, "Extended European Search Report", dated Jul. 2, 2026, from U.S. Appl. No. 18/992,286, from Foreign Counterpart to U.S. Appl. No. 18/992,286, pp. 1 through 9, Published: EP.

* cited by examiner

| RU ID | Per-RU NeighborList | Time of Last Update | Average RSRP |
|---|---|---|---|
| RU1 | FDD cell 214 | 2021-11-10:15:39:43 | -88dBm |
| | TDD cell 212 | 2021-11-10:18:00:24 | -90dBm |
| RU2 | FDD cell 214 | 2021-11-10:10:12:56 | -90dBm |
| | TDD cell 212 | 2021-11-09:20:10:14 | -89dBm |
| RU3 | FDD cell 214 | 2021-11-11:15:07:33 | -86dBm |
| | TDD cell 212 | 2021-11-10:08:38:09 | -87dBm |
| RU4 | FDD cell 214 | 2021-11-10:14:54:18 | -88dBm |
| | TDD cell 212 | 2021-11-10:06:40:31 | -90dBm |
| RU5 | TDD cell 212 | 2021-11-10:22:25:50 | -96dBm |
| RU6 | | | |
| RU7 | | | |
| RU8 | FDD cell 214 | 2021-11-10:18:23:16 | -89dBm |
| RU9 | FDD cell 214 | 2021-11-11:06:22:41 | -90dBm |
| RU10 | FDD cell 214 | 2021-11-10:21:32:19 | -90dBm |

| RU ID | Per-RU Neighbor List | Time of Last Update | Average RSRP |
|---|---|---|---|
| RU1 | FDD cell 407 | 2021-11-10:15:39:43 | -88dBm |
| | TDD cell 406 | 2021-11-10:18:00:24 | -90dBm |
| | Cell 405 | 2021-11-11:07:00:24 | -102dBm |
| RU2 | FDD cell 407 | 2021-11-10:10:12:56 | -90dBm |
| | TDD cell 406 | 2021-11-09:20:10:14 | -89dBm |
| | Cell 405 | 2021-11-10:14:23:18 | -107dBm |
| RU3 | FDD cell 407 | 2021-11-11:15:07:33 | -86dBm |
| | TDD cell 406 | 2021-11-10:08:38:09 | -87dBm |
| RU4 | FDD cell 407 | 2021-11-10:14:54:18 | -88dBm |
| | TDD cell 406 | 2021-11-10:06:40:31 | -90dBm |
| RU5 | TDD cell 406 | 2021-11-10:22:25:50 | -96dBm |
| RU6 | FDD cell 408 | 2021-11-10:18:10:09 | -104dBm |
| RU7 | FDD cell 408 | 2021-11-11:06:59:47 | -100dBm |
| RU8 | FDD cell 407 | 2021-11-10:18:23:16 | -92dBm |
| | Cell 405 | 2021-11-11:17:10:24 | -115dBm |
| RU9 | FDD cell 407 | 2021-11-11:06:22:41 | -93dBm |
| RU10 | FDD cell 407 | 2021-11-10:21:32:19 | -90dBm |
| RU11 | FDD cell 407 | 2021-11-11:12:33:24 | -104dBm |
| RU12 | FDD cell 407 | 2021-11-11:13:01:11 | -108dBm |
| RU13 | | | |
| RU14 | | | |
| RU15 | | | |
| RU16 | | | |

PER-RADIO UNIT NEIGHBOR LIST

CROSS-REFERENCE TO RELATED APPLICATIONS

This application is a 371 National Stage of International Application No. PCT/US2023/071662, filed on Aug. 4, 2023, and titled "PER-RADIO UNIT NEIGHBOR LIST," which claims benefit of U.S. Provisional Application No. 63/398,633, filed on Aug. 17, 2022, and titled "PER-RADIO UNIT NEIGHBOR LIST," the contents of which are incorporated herein in their entirety.

BACKGROUND

A centralized or cloud radio access network (C-RAN) is one way to implement base station functionality in a wireless system. Typically, for each cell (that is, for each physical cell identifier (PCI)) implemented by a C-RAN, one or more baseband unit (BBU) entities (also referred to here simply as "BBUs") interacts with multiple radio units (also referred to here as "RUs," "radio points," or "RPs") implement a base station entity in order to provide wireless service to various items of user equipment (UEs). The BBU entities may comprise a single entity (sometimes referred to as a "baseband controller" or simply a "baseband band unit" or "BBU") that performs Layer-3, Layer-2, and some Layer-1 processing for the cell. The BBU entities may also comprises multiple entities, for example, one or more central unit (CU) entities that implement Layer-3 and non-real time critical Layer-2 functions for the associated base station and one or more distribution units (DU) that implement the time critical Layer-2 functions and at least some of the Layer-1 (also referred to as the Physical Layer) functions for the associated base station. Each CU can be further partitioned into one or more user-plane and control-plane entities that handle the user-plane and control-plane processing of the CU, respectively. Each such user-plane CU entity is also referred to as a "CU-UP," and each such control-plane CU entity is also referred to as a "CU-CP." In this example, each RU is configured to implement the radio frequency (RF) interface and the physical layer functions for the associated base station that are not implemented in the DU. The multiple radio units are typically located remotely from each other (that is, the multiple radio units are not co-located), and the BBU entities are communicatively coupled to the radio units over a fronthaul network. The radio units may also be collocated (for example, in instances where each radio unit processes different carriers or time slices).

In a wireless system, the user equipment serviced by a given cell periodically reports information about radio frequency characteristics of intra-/inter-frequency, inter-RAT neighbors to, for example, the C-RAN. The radio unit primarily used for downlink/uplink operation by a particular user equipment is referred to as the primary serving radio unit for that user equipment. When the user equipment reports radio frequency characteristics of the neighbors, the primary serving radio unit is configured to provide the radio frequency characteristics to the baseband entity that manages the respective primary serving radio units. For example, in a fifth generation (5G) New Radio (NR) or fourth generation (4G) Long Term Evolution (LTE) wireless system, the user equipment may be instructed by the wireless system (for example, by BBU entity 102) to report periodically the signal strength of a neighbor cells to construct and maintain a list of the neighbor cells for a particular cell at the cell level. Once the list is constructed, the C-RAN can use the information in the list to selectively choose neighbor cells for functions such as carrier aggregation or handover. For example, when a user equipment reports the signal strength of its current serving cell below a threshold, the base station may configure the user equipment to measure and report A3 event of the three strongest inter-frequency neighbors on the neighbor list for handover. In case of carrier aggregation, the base station may configure a user equipment to measure and report A4 event of the two strongest inter-frequency neighbors on the neighbor list.

A user equipment requires a 'measurement gap' to measure signal power of inter-frequency, inter-RAT neighbors. During the measurement gap, it is unable to receive or transmit data and therefore is unable to communicate using the wireless system. Furthermore, once a user equipment begins a measuring event by attempting to measure the signal strength of a cell, it cannot abort a measurement event unless and until either it actually detects a neighboring cell whose signal power is higher than a signal power threshold (for example, A3/A4 threshold) or it is requested to stop the measurement by the base station. The longer it takes for the user equipment to complete the measurement event, the more periodic measurement gaps the user equipment will experience. Depending on where the user equipment is located in the cell, the user equipment may take a significantly long time before it finally reports the signal strength of a neighboring cell, during which time the throughput for the user equipment will be greatly impacted. The adverse impacts to the user equipment may hinder or otherwise reduce the effectivity of various operating functions performed in the wireless system, such as carrier aggregation and handover.

SUMMARY

The details of one or more embodiments are set forth in the description below. The features illustrated or described in connection with one exemplary embodiment may be combined with the features of other embodiments. Thus, any of the various embodiments described herein can be combined to provide further embodiments. Aspects of the embodiments can be modified, if necessary to employ concepts of the various patents, applications and publications as identified herein to provide yet further embodiments.

In one embodiment, a method for operating a wireless system is disclosed. The wireless system includes a baseband unit entity communicatively coupled to a plurality of radio units. The plurality of radio units is configured to provide wireless service to user equipment located in at least one managed cell configured to be managed by the baseband unit entity. The method comprises receiving signal power measurements corresponding to at least one cell, wherein the signal power measurements include a signal power of the at least one cell and are associated with one or more radio units of the plurality of radio units. The method comprises designating the at least one cell as a neighbor cell for each of the one or more radio units of the plurality of radio units in the at least one managed cell based on the signal power measurements. The method comprises generating a list including each of the plurality of radio units and the neighbor cell associated with the one or more radio units of the plurality of radio units in the at least one managed cell. The method comprises performing one or more operating functions of the wireless system based on the generated list.

In another embodiment, a program product is disclosed. The program product comprises a non-transitory processor-readable medium on which program instructions configured to be executed by at least one processor are embodied. When executed by the at least one processor, the program instructions cause the at least one processor to: receive signal power measurements corresponding to at least one cell, wherein the signal power measurements include a signal power of the at least one cell and are associated with one or more radio units of a plurality of radio units in at least one managed cell of a wireless system; designate the at least one cell as a neighbor cell for each of the one or more radio units of a plurality of radio units in the at least one managed cell based on the signal power measurements; generate a list including each of the plurality of radio units and the neighbor cell associated with the one or more radio units of the plurality of radio units in the at least one managed cell; and perform one or more operating functions of the wireless system based on the generated list.

In another embodiment, a unit of a wireless system is disclosed. The unit is configured to provide wireless service to user equipment in at least one managed cell. The unit comprises a network interface configured to receive wireless communication signals from a communication network. The unit comprises circuitry coupled to the network interface and configured to generate downlink signals from the wireless communication signals. The unit comprises a downlink interface coupled to the circuitry and configured to provide the downlink signals to a plurality of radio units communicatively coupled to the unit for transmission to the user equipment in the at least one managed cell. The unit comprises at least one processor coupled to the downlink interface. The at least one processor is configured to: receive signal power measurements corresponding to at least one cell, wherein the signal power measurements include a signal power of the at least one cell and are associated with one or more radio units of a plurality of radio units in the at least one managed cell; designate the at least one cell as a neighbor cell for each of the one or more radio units of the plurality of radio units in the at least one managed cell based on the signal power measurements; and generate a list including each of the plurality of radio units and the neighbor cell associated with the one or more radio units of the plurality of radio units in the at least one managed cell; and perform one or more operating functions of the wireless system based on the generated list.

BRIEF DESCRIPTION OF THE DRAWINGS

Understanding that the drawings depict only exemplary embodiments and are not therefore to be considered limiting in scope, the exemplary embodiments will be described with additional specificity and detail through the use of the accompanying drawings, as briefly described below and as further described in the detailed description.

Figure 1:
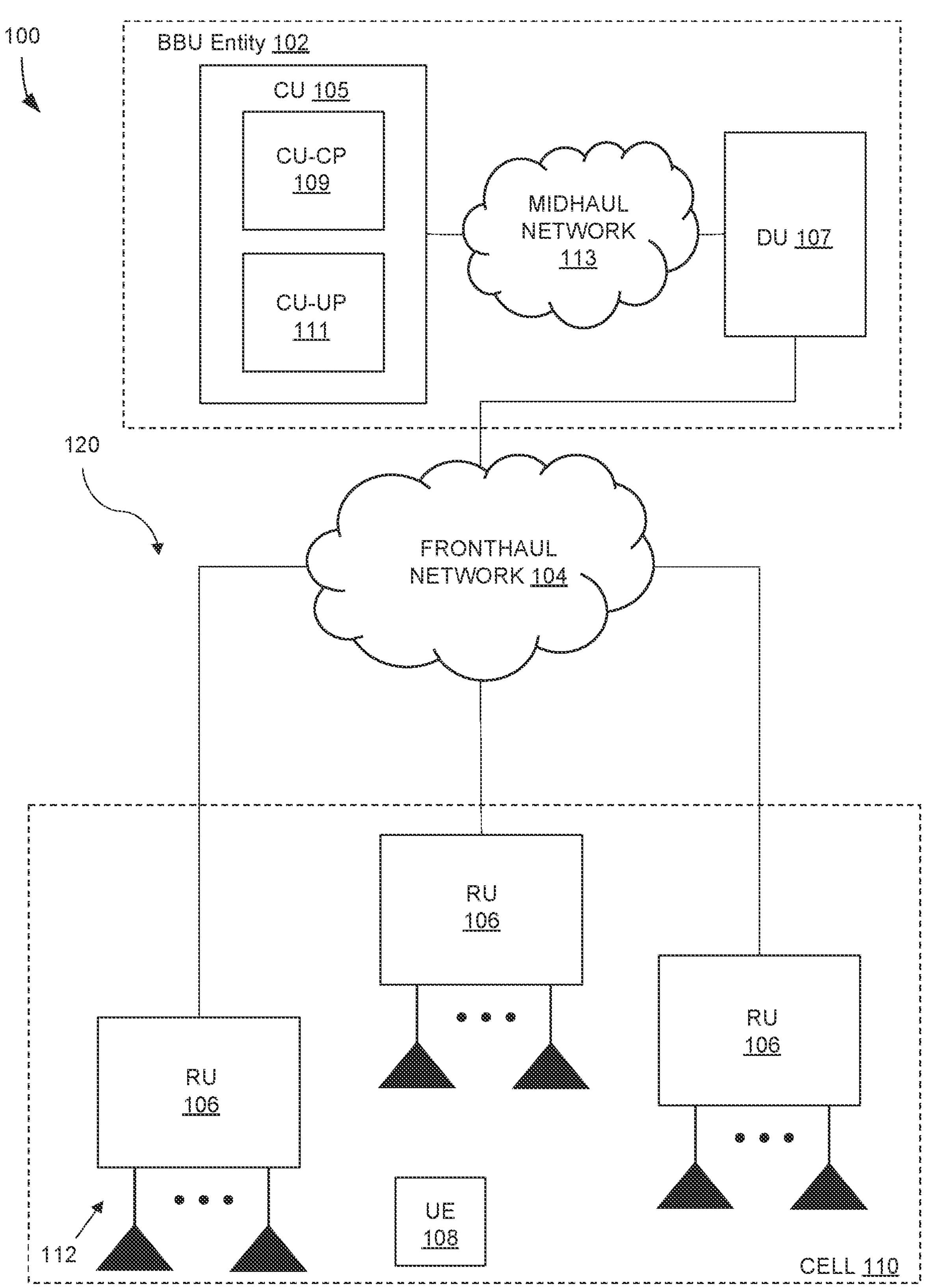
FIG. 1 depicts a block diagram of an exemplary wireless system configured to provide wireless service to a plurality of user equipment in one or more cells.

In accordance with common practice, the various described features are not drawn to scale but are drawn to emphasize specific features relevant to the exemplary embodiments.

DETAILED DESCRIPTION

In the following detailed description, reference is made to the accompanying drawings that form a part hereof, and in which is shown by way of illustration specific illustrative embodiments. However, it is to be understood that other embodiments may be utilized and that logical, mechanical, and electrical changes may be made. Furthermore, the method presented in the drawing figures and the specification is not to be construed as limiting the order in which the individual steps may be performed. The following detailed description is, therefore, not to be taken in a limiting sense.

The present disclosure describes improvements to wireless system operation. Generally, the present disclosure provides systems and methods for maintaining a per-RU neighbor list with one or more network elements in the wireless system. The per-RU neighbor list correlates neighboring cells with radio units instead of correlating neighboring cells at the cell level. Correlating neighbor cells to specific radio units serving a managed cell (a per-RU neighbor cell association), rather than generically associating neighbor cells to the managed cell (a cell-to-cell association), enables the user equipment utilizing the wireless system to report signal power measurements of neighbor cells that are likely to be within the measurement parameters necessary to successfully complete a measurement event, thereby enabling the user equipment to report events more efficiently and experience less throughput impact.

FIG. 1 depicts a block diagram illustrating an exemplary wireless system in which the per-RU neighbor list can be used. In the example shown in FIG. 1, the base station 120 includes one or more baseband unit (BBU) entities 102 communicatively coupled to multiple radio units (RUs) 106 via a fronthaul network 104. The base station 120 is configured to provide wireless service to various user equipment (UEs) 108 (for example, phones, laptops, and other connectivity devices) in one or more cells 110. Each BBU entity 102 can also be referred to simply as a BBU. For example, the wireless system 100 can include at least one 5G NR base station 120 (which is referred to as a "gNodeB" or "gNB"), where each 5G NR base station 120 serves a respective cell 110 (or multiple cells) for providing wireless service to UEs 108.

In the example shown in FIG. 1, the one or more BBU entities 102 include one or more central units (CUs) 105 (alternatively, a "control unit") and one or more distributed units (DUs) 107. Each CU 105 is configured to implement Layer-3 and non-real time Layer-2 functions for the cell 110. Each DU 107 is configured to implement the time critical Layer-2 functions and at least some of the Layer-1 (also referred to as the physical layer) function for the cell 110. Each CU 105 can be further partitioned into one or more control-plane and user-plane entities 109, 111 that handle the control-plane and user-plane processing of the CU 105, respectively. Each such control-plane central unit entity 109 is also referred to as a CU-CP 109, and each such user-plane central unit entity 111 is also referred to as a CU-UP 111.

The radio units 106 are configured to implement the control-plane and user-plane Layer-1 functions not implemented by the DU 107 as well as the radio frequency functions. Each radio unit 106 can be located remotely from the one or more BBU entities 102 and located remotely from other radio units 106. Each radio units 106 can be implemented as a physical network function (PNF) and is deployed in or near a physical location where radio coverage is to be provided in the cell 110. In the example shown in FIG. 1, the radio units 106 are communicatively coupled to the DU 107 using a fronthaul network 104. In some examples, the fronthaul network 104 is a switched Ethernet fronthaul network (for example, a switched Ethernet network that supports the Internet Protocol (IP)).

Each of the radio units 106 includes or is coupled to a respective set of antennas 112 via which downlink RF signals are radiated to user equipment 108 and via which uplink RF signals transmitted by user equipment 108 are received. In some examples, each set of antennas 112 includes two or four antennas; however, each set of antennas 112 can include one or more antennas 112. In one configuration suitable, for example, in indoor deployments, each RU 106 is collocated with its respective set of antennas 112 and is remotely located from the one or more BBU entities 102 serving it and the other radio units 106. In another configuration more suitable for outdoor deployments, the sets of antennas 112 for the radio units 106 are deployed in a sectorized configuration such as being mounted at the top of a tower or mast. In such a sectorized configuration, the radio units 106 need not be collocated with the respective sets of antennas 112 and can be located at the base of the tower or mast structure, and can be collocated with the serving one or more BBU entities 102. Other configurations can be used.

The base station 120 that includes the components shown in FIG. 1 can be implemented using a scalable-cloud environment in which resources used to instantiate each type of entity can be scaled horizontally (that is, by increasing or decreasing the number of physical computers or other physical devices) and vertically (that is, by increasing or decreasing the power by increasing the amount of processing and/or memory resources of a given physical computer or other physical device). The scalable cloud environment can be implemented in various ways. For example, the scalable cloud environment can be implemented using hardware virtualization, operating system virtualization, and application virtualization (also referred to as containerization), as well as various combinations of two or more of the proceeding implementations. The scalable cloud environment can be implemented in other ways. In some examples, the scalable cloud environment is implemented in a distributed manner. That is, the scalable cloud environment is implemented as a distributed scalable cloud environment comprising at least one central cloud, at least one edge cloud, and at least one radio cloud.

In some examples, one or more components of the one or more BBU entities 102 (such as the central unit 105, CU-CP 109, CU-UP 111, and/or DU 107) are implemented as software virtualized entities that are executed in a scalable cloud environment on a cloud worker node under the control of the cloud native software executing on that cloud worker node. In various examples, the DU 107 is communicatively coupled to at least one CU-CP 109 and at least one CU-UP 111, which can also be implemented as software virtualized entities. In other examples, one or more components of the BBU entities 102 (for example, the CU-CP 109, CU-UP 111, and/or DU 107) are implemented as a single virtualized entity executing on a single cloud worker node. For example, the at least one CU-CP 109 and the at least one CU-UP 111 can each be implemented as a single virtualized entity executing on the same cloud worker node or as a single virtualized entity executing on a different cloud worker node. Other configurations are possible. In another example, the CU 105 can be implemented using at least one CU-CP virtual network function (VNF) and multiple CU-UP VNFs and using multiple virtualized entities executing on one or more cloud worker nodes. Also, the CU 105 and DU 107 can be implemented in the same cloud such as a radio cloud or in an edge cloud. In some examples, the DU 107 is configured to be coupled to the CU-CP 109 and CU-UP 111 over a midhaul network 113 (including a network that supports IP).

Although the embodiments described herein are primarily described as being implemented for use to provide 5G NR service, it is to be understood the techniques described here can be used with other wireless interfaces (for example, fourth generation (4G) Long-Term Evolution (LTE) service) and references to “gNB” can be replaced with the more general term “base station” or “base station entity” and/or a term particular to the alternative wireless interfaces (for example, “enhanced NodeB” or “eNB”). Further, unless explicitly stated to the contrary, references to Layer 1, Layer 2, Layer 3, and other or equivalent layers (such as the Physical Layer or the Media Access Control (MAC) Layer) refer to layers of the particular wireless interface (for example, 4G LTE or 5G NR) used for wirelessly communicating with user equipment 108. Furthermore, it is also to be understood that 5G NR embodiments can be used in both standalone and non-standalone modes (or other modes to be developed) and the description is not intended to be limited to any particular mode. Moreover, the software and hardware used to implement the wireless system 100 is also generally referred to here as “entities” or “radio access network entities.”

Figure 2A:
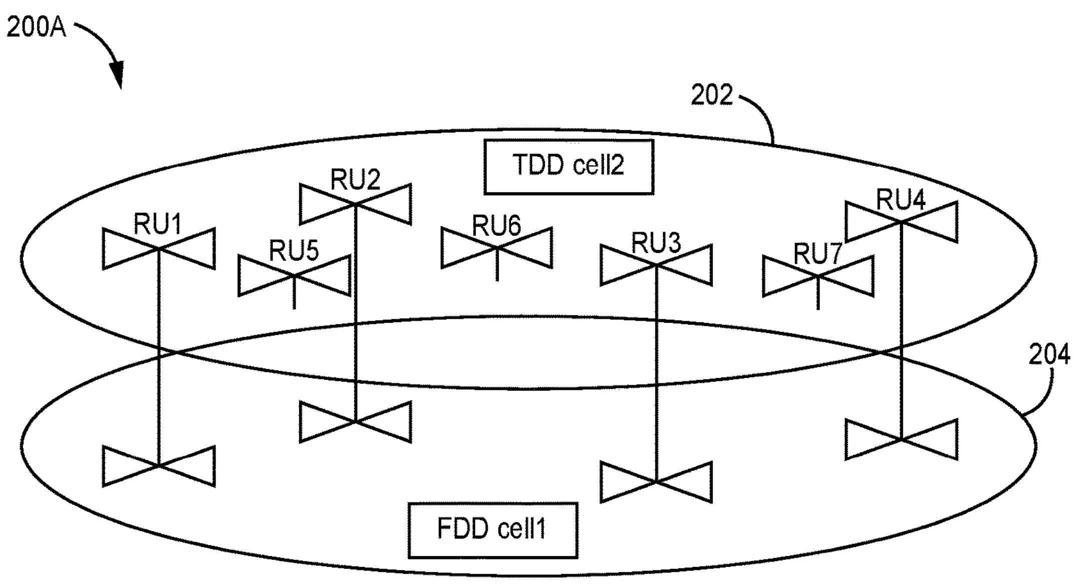
FIGS. 2A-2B depict diagrams illustrating deployment of a plurality of radio units in a wireless system, according to one or more embodiments.
Figure 2B:
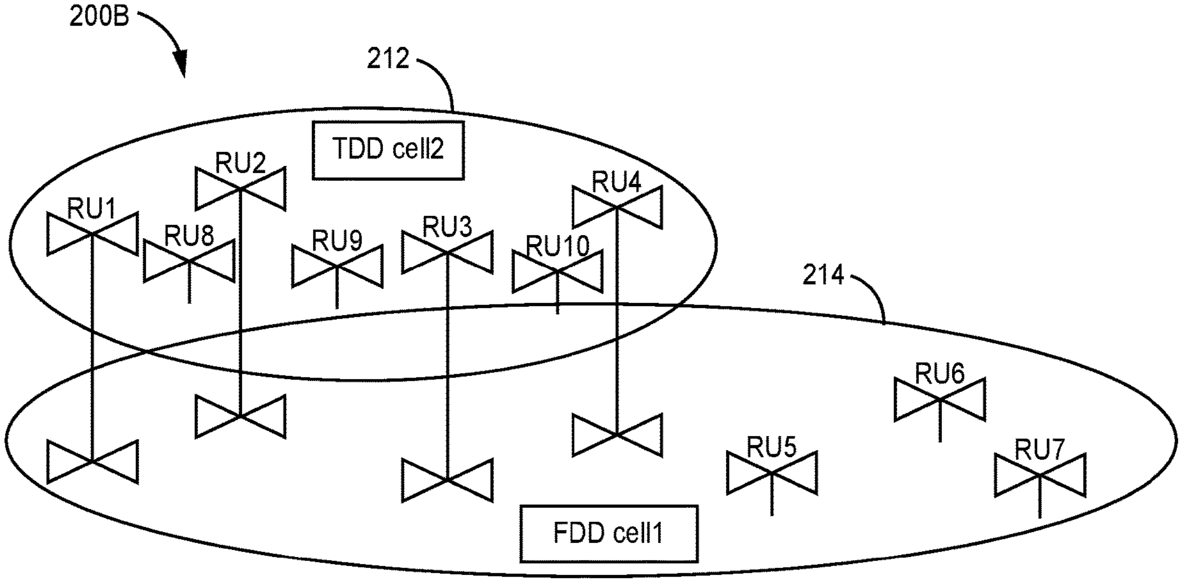

FIGS. 2A-2B depict diagrams illustrating deployment of a plurality of radio units in a wireless system, according to one or more embodiments. Referring first to FIG. 2A, the wireless system 200A is generally configured to provide wireless service to user equipment (not shown in FIG. 2A or FIG. 2B) located in a coverage zone of a cell 202, 204. In the example shown in FIG. 2A, wireless system 200A includes a time-division duplex (TDD) cell 202 and a frequency-division duplex (FDD) cell 204 that provide approximately the same zone of coverage to the user equipment accessing the wireless system 200A. In one example, the wireless system 200A is part of a fifth generation (5G) wireless system, although a fourth generation (4G) wireless system can also be used, or other types of networks.

The TDD cell 202 includes a plurality of radio units (RU1, RU2, RU3, RU4, RU5, RU 6, RU7) each located at geographically distinct locations within the TDD cell 202. Each radio unit is configured to communicate downlink signals from a baseband unit entity not explicitly shown in FIG. 2A (for example, baseband unit entity 102 as described in FIG. 1) to the user equipment and to communicate uplink signals from the user equipment to the baseband unit entity. In some examples, the radio units include hardware (such as radio unit circuitry) configured to process downlink signals derived from the baseband entity and to communicate radio frequency (RF) signals from the downlink signals to the user equipment (not shown). In the uplink direction, the user equipment transmits RF uplink signals that are received by the radio unit(s) that are within range of the user equipment. The radio unit is configured to (for example, by the radio unit circuitry) to process the RF uplink signals and communicate uplink signals from the RF uplink signals to, for example, the baseband unit entity.

In some examples, however, the functionality of one or more radio units can be virtualized using appropriate software. Also, each radio unit can host multiple radio modules (RM), which are virtualized modules that appear to be independent radio units from the perspective of the wireless system 200A (for example, from the perspective of the baseband unit entity). As shown in FIG. 2A, RU1, RU 2, RU 3, and RU 4 each have a corresponding radio module within FDD cell 204 and a corresponding radio module within TDD cell 202. A radio unit located in one cell which has an associated radio module in another cell is referred to as a collocated radio unit. Some radio units, however, may not be collocated in the wireless system 200A, and will not have a corresponding radio module in an adjacent cell. In FIG. 2A, RU 5, RU 6, and RU 7 are only located in TDD cell 202 to improve the coverage of the TDD cell 202, which utilizes a higher frequency band compared to the FDD cell 204.

In some examples, such as shown in FIG. 2B, the coverage between a TDD cell 212 and an FDD cell 214 may not be equivalent. During cell deployment, the number of radio units and their locations in the cell can be initially determined based on the size or environment of the venue as well as by radio frequency characteristics of the cell with respect to a frequency band. For example, the compilation of the transmitted power levels along with the power gains and losses in the cell, known as the RF link budget, can be used to determine the appropriate number of radio units and their corresponding location in the cell. If coverage is not equivalent in one frequency band in relation to another frequency band (for example, a collocated high-frequency band radio modules do not provide the same RF coverage as low frequency band radio modules within the coverage zone), additional radio units can be added during or after deployment to fill coverage deficiencies.

In wireless system 200B, FDD cell 214 provides coverage over a substantially larger geographical area than TDD cell 212. TDD cell 212 includes RU 1, RU 2, RU 3, RU 4, RU 8, RU 9, and RU 10. Among those radio units, RU 1, RU 2, RU 3, and RU 4 are collocated between TDD cell 212 and FDD cell 214, while RU 8, RU 9, and RU 10 are placed to improve the coverage of the TDD cell 212. In addition to the collocated radio modules for RU 1, RU 2, RU 3, and RU 4, FDD cell 214 includes non-collocated RU 5, RU 6, and RU 7 located outside the coverage zone for TDD cell 212. The overlapping coverage zone between TDD cell 212 and FDD cell 214 is referred to as the "hotspot" for the two cells. In FIG. 2B, the RUs within TDD cell 212 are located in the hotspot of the wireless system 200B since the coverage of these RUs overlaps with a corresponding coverage zone in FDD cell 214.

Figure 3:
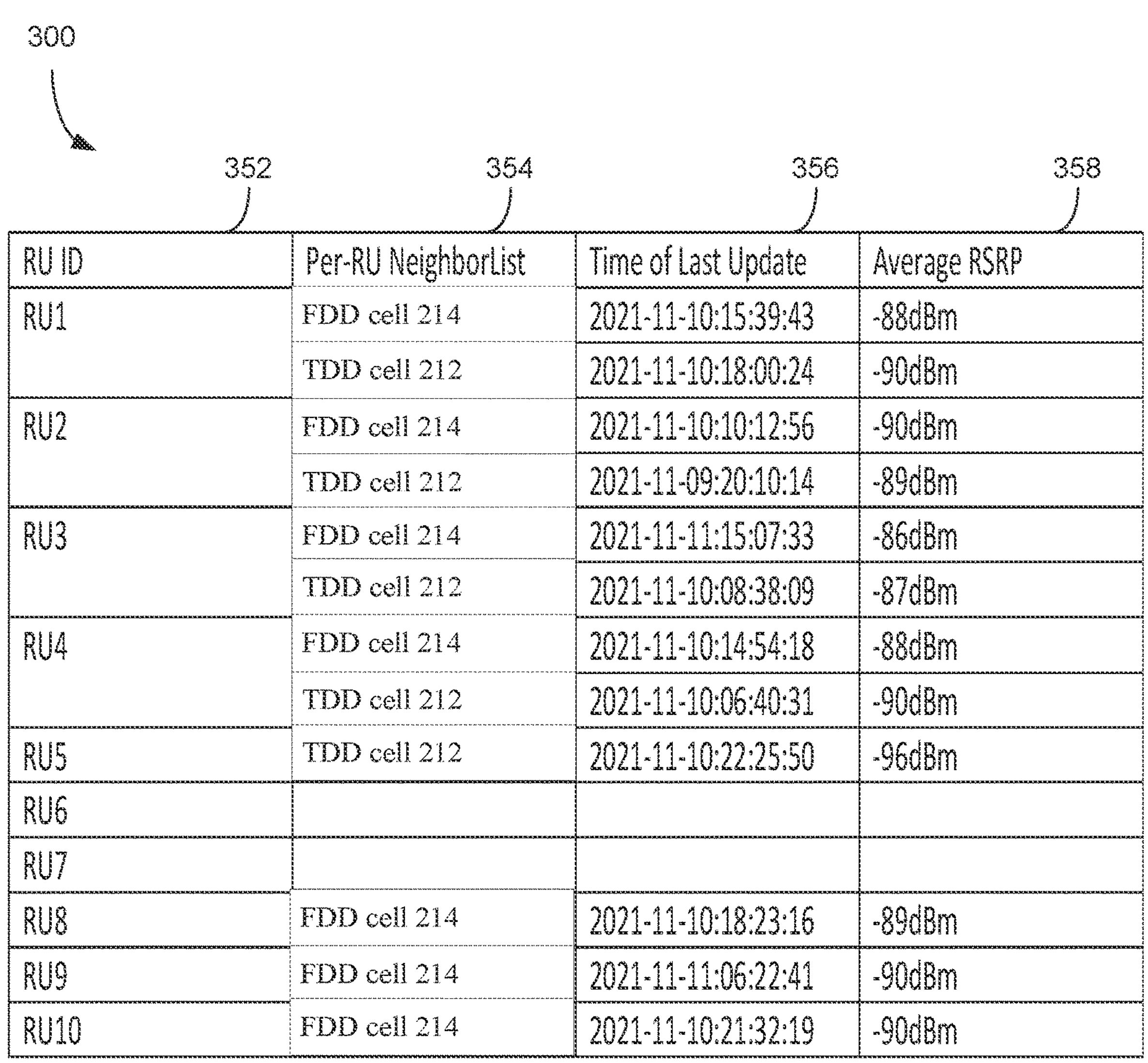
FIG. 3 depicts a table of an exemplary per-RU neighbor list with reference to the wireless system of FIG. 2B.

One exemplary embodiment of a per-RU list is illustrated in FIG. 3, which depicts a table including a list of radio units with corresponding neighboring cells. "Neighbor cell" or "neighboring cell" as defined herein is a cell that can be detected by user equipment serviced by at least one radio unit. In some examples, a neighbor cell of an RU can be a cell entry whose average signal power measurement exceeds a threshold value. A neighbor cell can have some average RSRP, RSRQ, or SINR measurements based on several RSRP, RSRQ, or SINR measurements from several user equipment. As described further, if this average value exceeds a carrier aggregation CA threshold and/or a handover HO threshold, the neighbor cell can be used for carrier aggregation and/or handover.

Current 4G and 5G networks support multi-carrier deployment with collocated and non-collocated radio modules. Multi-carrier deployments can lead to carrier aggregation by aggregating the carrier frequency band from a primary component carrier (PCC) with a frequency band from one or more secondary component carriers (SCC). In an intra-band configuration, the PCC and the SCC are in the same frequency band, whereas in an inter-band configuration, the PCC and the SCC are not in the same frequency band. Generally, collocation is beneficial for carrier aggregation, and carrier aggregation can become inefficient when the primary component carrier (PCC) and secondary component carriers (SCCs) have noncollocated radio modules. A base station implementing carrier aggregation generally has two options in this scenario: it (1) may blindly activate the secondary component carrier; or it (2) may configure the user equipment to report a measurement event before activating the secondary component carrier. For example, in an 5G NR wireless system, the user equipment may report an A4 measurement event which confirms that the signal power of a serving cell is better than a threshold value before the base station initiates carrier aggregation. In the first case, data transmitted on the secondary component carrier may not be detected or decoded by the user equipment, thereby resulting in lower user equipment throughput and lower spectrum efficiency. In the latter case, the user equipment throughput on the primary component carrier is adversely impacted by taking measurement gaps to measure and report secondary component carrier signal power. This is because the secondary component carrier is considered to be an inter-frequency neighbor of the primary component carrier and, as previously mentioned, the user equipment is not able to receive or transmit data during a measurement gap. The adverse impact to user throughput can last for a long time when a secondary component carrier signal is too weak to meet the measurement event threshold where the user equipment is located and the user equipment keeps measuring periodically.

To address the adversities resulting from carrier aggregation reporting by the user equipment, table 300 includes a per-RU neighbor list to avoid a situation in which a user equipment attempts to measure and report an inter-frequency neighbor such as an SCC whose signal power is below a reporting threshold. In one example, table 300 is generated by CU 105 of FIG. 1, and is used to manage and configure user equipment reporting for carrier aggregation. Table 300 can be unique to a particular CU and includes all the cells managed by that particular CU. Where the wireless system includes multiple CUs, each CU can generate and manage a table for the managed cells serviced by that CU.

Referring to the specifics of the table 300 in conjunction with FIG. 2B, column one on the left side (column 352) includes a list of the radio units within managed cell(s) that are managed by the CU. Since there are ten total radio units in TDD cell 212 and corresponding FDD cell 214, table 300 includes a list of the ten radio units that are identified in FIG. 2B. If more radio units are deployed after deployment of a cell, those radio units can be added to the list.

The second column (column 354) lists the neighbor cells that correspond to each RU in the TDD cell 212 and FDD cell 214. In one example, the neighboring cells are listed by their physical cell identifier (PCI). In some examples, however, a neighbor cell is added to column 354 for one or more radio units when user equipment serviced by a respective radio unit detects the neighbor cell. In other examples, the neighbor cells for a given radio unit can be determined based on the average signal power measurements for the neighbor cells as reported from user equipment. For example, when a first measurement for a neighbor cell is received for an RU that is above a first threshold, then the neighbor cell is added as an entry for that RU in the second column of table 300. Subsequent measurements regardless of whether they are above or below the first threshold are then used to calculate an average signal power measurement for that neighbor cell. If the average value calculated is above the first threshold, the neighbor cell entry in the second column of table 300 is retained for that RU. Otherwise, if the average signal power measurements drops below the first threshold, then the neighbor entry for that RU is deleted from the second column of table 300. Adding neighbor cells with corresponding average signal power measurements above a signal power threshold helps filter cells added to the per-RU list so that only the strongest neighbor cells are considered for operating functions of the wireless system, and may also reduce the resources needed to maintain the per-RU list through the reduced amount of neighbor cell entries that are stored. When the signal power measurement for the neighboring cell is greater than a second threshold value for carrier aggregation, the neighboring cell is considered for SCC.

Once table 300 is generated, it is maintained and updated based on new measurement reported by various user equipment of the managed cell. If the signal power measurements corresponding to a neighbor cell that was previously associated with a radio unit later fall below the second threshold used for carrier aggregation (the CAThreshold), then that neighbor cell is not used as an SCC for carrier aggregation. Depending on how the CAThreshold is set or adjusted, a cell can be associated with at least one radio unit as a neighbor cell (by having the signal power measurements for that cell be higher than a first threshold), but may not necessarily be a candidate for SCC addition, if its corresponding signal power measurements do not exceed the CAThreshold. If the signal power measurements later rise above the CAThreshold during a subsequent update, the cell can then be used for SCC addition.

While a neighboring cell is associated with a radio unit, the CU can configure the user equipment served primarily by the radio unit to only report signal power measurements, for example A4 measurement for carrier aggregation, for the neighboring cells in table 300 associated with that radio unit, instead of having the user equipment attempt to report measurements for a cell that may not be within the range of the user equipment as evidenced by the low signal power for a respective cell.

Referring to FIG. 2B, RU 1 is located within TDD cell 212. Accordingly, a user equipment with RU1 in TDD cell 212 as its primary serving radio unit will report the signal power measurements for FDD cell 214 above the signal power threshold, which means that FDD cell 214 will be a viable inter-frequency neighbor that can be used for carrier aggregation. Additionally, since RU 1 is collocated with FDD cell 214, a user equipment having RU 1 in FDD cell 214 as its primary serving radio unit will also report signal power measurements for TDD cell 212 above the signal power threshold for RU 1. This is reflected in table 300, which shows both FDD cell 214 and TDD cell 212 as neighbor cells for RU 1. Similarly, RU 2, RU 3, and RU 4 are all located in TDD cell 212 and all have collocated radio modules in FDD cell 214. Therefore, user equipment with RU 2, RU 3, or RU 4 as its primary serving radio unit will report signal power measurements for both TDD cell 212 and FDD cell 214 above the signal power threshold for those units.

Unlike RUs 1-4, RU 5 is not located within the coverage of TDD cell 212 and only has a radio module within FDD cell 214. Hence, only user equipment that are connected to the FDD cell 214 can have RU 5 as a primary serving radio unit. For any user equipment with RU 5 as a primary serving radio unit, the signal power measurement corresponding to RU 4 of TDD cell 212 will be of sufficient strength so that the user equipment will report TDD cell 212 for RU 5. Therefore, as shown in table 300, RU 5 includes only one neighbor cell for TDD cell 212. Meanwhile, RU 8, RU 9, and RU 10 are located in TDD cell 212 only and do not have collocated radio modules in FDD cell 214. Accordingly, only user equipment connected on TDD cell 212 may have RU 8, RU 9, or RU 10 as their primary serving radio unit. As shown in table 300, only signal power measurements from FDD cell 214 will exceed the signal power measurement threshold for user equipment near RU 8, RU 9, and RU 10, and so only FDD cell 214 will be a neighboring cell for these radio units as shown in table 300.

Although RU 6 and RU 7 are located in FDD cell 214, they are located far from TDD cell 212. Therefore, user equipment with RU 6 or RU 7 as their primary serving radio unit in FDD cell 214 will not have sufficient TDD signal coverage for the base station to list TDD cell 212 as a neighbor cell for either RU 6 or RU 7. Since RU 6 and RU 7 are not collocated with TDD cell 212, accordingly, there will be no user equipment with RU 6 or RU 7 as their primary serving radio unit in TDD cell 212, hence no user equipment will report FDD cell 214 as an inter-frequency neighbor for RU 6 or RU 7, which is shown in table 300 with no per-RU neighbor cells corresponding to RU 6 or RU 7.

In some examples, the per-RU neighbor list can include other information as well. For example, the third column (column 356) of table 300 includes a timestamp of the last update that was provided by a user equipment that reported the signal power measurements of a neighbor cell(s) associated with a respective radio unit. The timestamp can include a bit value indicating the day, month, year, and the hour, minute, and seconds values of the time that was recorded from the user equipment reporting event. If a neighbor cell associated with a respective radio unit is not reported by user equipment serviced by the radio unit during a subsequent periodic update, the neighbor cell is removed as a neighbor cell for that radio unit (although the neighbor cell could still be associated with a neighbor cell to other radio units). Additionally, the signal power measurement corresponding to each neighboring cell as reported by a user equipment can be included as shown in column four (column 358) of table 300. In the example shown in FIG. 3, the signal power measurement is an average reference signal received power (RSRP) measurement, which can be averaged for the measurements reported by each of the user equipment for a corresponding neighbor cell. The signal power measurements can be represented by other quantities (reference signal received quality (RSRQ), or signal-to-interference-plus-noise ratio (SINR)). Other information can also be included in table 300.

Once the wireless system is deployed, the CU can generate table 300 as it receives measurement event reports from at least one user equipment and can continue to update the table periodically as new measurement event reports are received or when the wireless system changes (such as by deploying new radio units or by deploying the radio units in a different physical or network location). In one example the network element (an eNB/gNB, for example) managing the managed cell(s) for which table 300 is generated configures the user equipment serviced by a respective radio unit in the list to report the signal power measurements of the inter-frequency neighbor cells that: (1) are associated with the primary serving radio unit for the user equipment; (2) are managed by the same DU as the cell serving the user equipment; and (3) have an average RSRP greater than or equal to a signal power threshold, such as a carrier aggregation signal power threshold. In one example, the eNB/gNB configures the user equipment by sending a message via the radio resource control (RRC) protocol directing the user equipment to measure the signal power of the inter-frequency neighbor cells and to report the measurements back to the eNB/gNB.

Once table 300 is generated, the base station can adjust how carrier aggregation is performed based on the information presented in the table. For example, the base station can easily decide whether to configure a user equipment to report an A4 measurement event for a potential secondary component carrier addition. Using table 300 as an example, if a carrier aggregation signal power threshold is set at −92 dBm so that any cells with a signal power measurement higher than that threshold will be added as an inter-frequency neighbor for a given radio unit, the base station will configure the user equipment to undergo A4 measurement reporting for any user equipment with a primary serving radio unit on the TDD cell 212 (RU 1, RU 2, RU 3, RU 4, RU 8, RU 9, RU 10) as well as any primary serving radio unit connected on FDD cell 214 with RU 1, RU 2, RU 3, or RU 4 as a primary serving radio unit. Note that under the −92 dBm threshold, some cells shown in table 300 would not be listed, such as RU 5. If the threshold is set lower (for example, at −100 dBm), the base station can configure user equipment associated with other primary serving radio units to report signal power measurements, including user equipment associated with RU 5 in FIG. 2.

Figure 4:
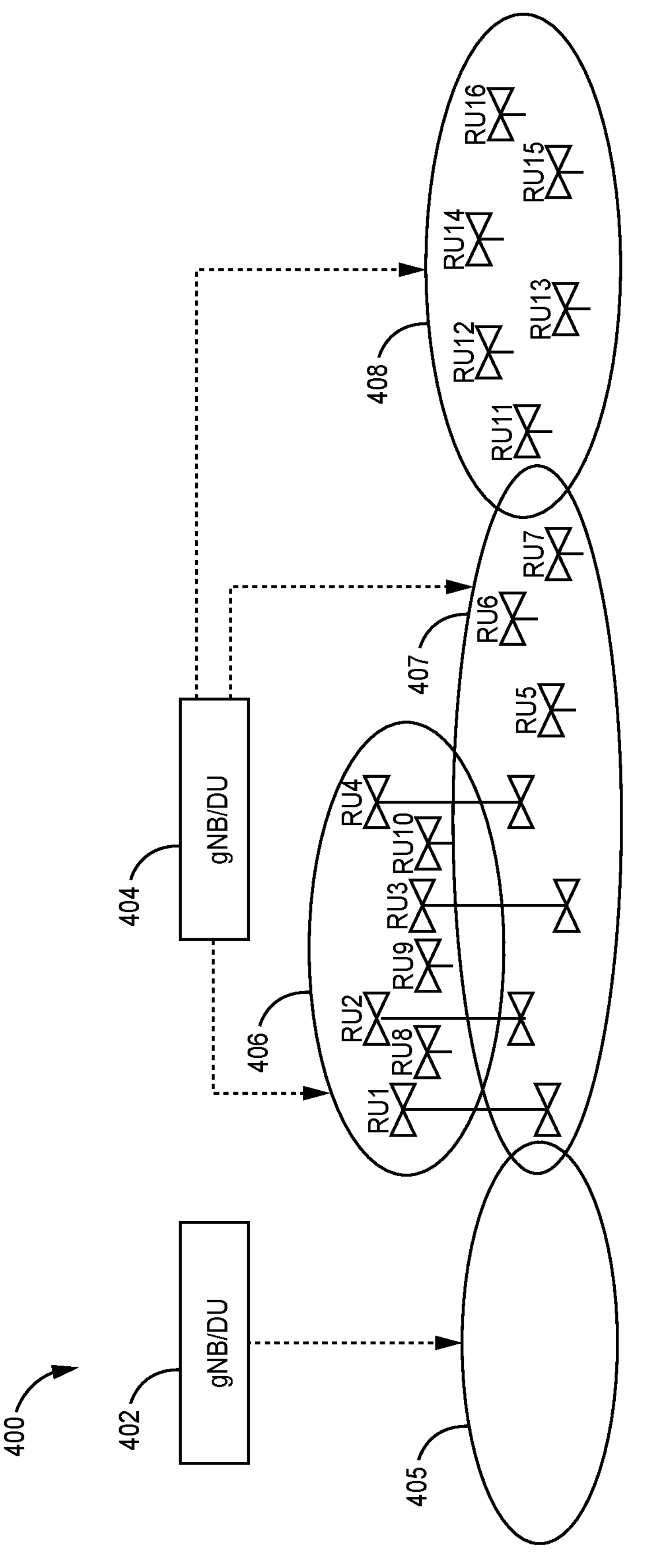
FIG. 4 depicts a diagram illustrating exemplary deployment of a plurality of neighboring cells including a plurality of radio units in a wireless system.

FIG. 4 depicts a diagram illustrating deployment of a plurality of neighboring cells including a plurality of radio units in a wireless system. The wireless system 400 includes a TDD cell 406 and an FDD cell 407, cell 405 partially overlapping with coverage of FDD cell 407, and FDD cell 408 partially overlapping with coverage of FDD cell 407. TDD cell 406, FDD cell 407, and FDD cell 408 correspond to base station 404, while cell 405 corresponds to base station 402 that is independent from base station 404. Each base station 402 and 404 can be configured to generate a per-RU neighbor list as described with respect to FIGS. 1-3. For pedagogical explanation, FIG. 4 emphasizes the cells managed by base station 404 (instead of base station 402), and although not shown, cell 405 could include one or more radio units serving cell 405.

Wireless system 400 is configured to support a handover process in which the base station 404 monitors user equipment movement through its respective cells. Handover occurs when a user equipment transitions from one cell to another cell so that the user equipment becomes associated with a different cell, or is "handed off" to another cell. In a conventional handover process, the base station managing the cell currently serving the user equipment determines the proper target cell to hand over the user equipment. However, if a base station determines a target cell based only on the information of known neighboring cells (as is the case for neighbor lists at the cell level), it risks handing off a user equipment to a neighbor cell that is actually outside of the acceptable signal power for the user equipment. Furthermore, if the base station currently serving the user equipment configures the user equipment to report the signal power measurements of all known neighboring cells (as is the case for neighbor lists at the cell level), the user equipment may be located in an area where it is difficult to actually measure the signal power from a "neighboring cell" that is neighboring the cell serving the user equipment but is actually significantly far from the user equipment itself. Measuring all neighbor cells thus requires the user equipment to measure signal power for a higher number of cells, a longer time to measure each of the cells (and hence to trigger the handover process), and may further lead to handoff failure due to delayed handover.

Figure 5:
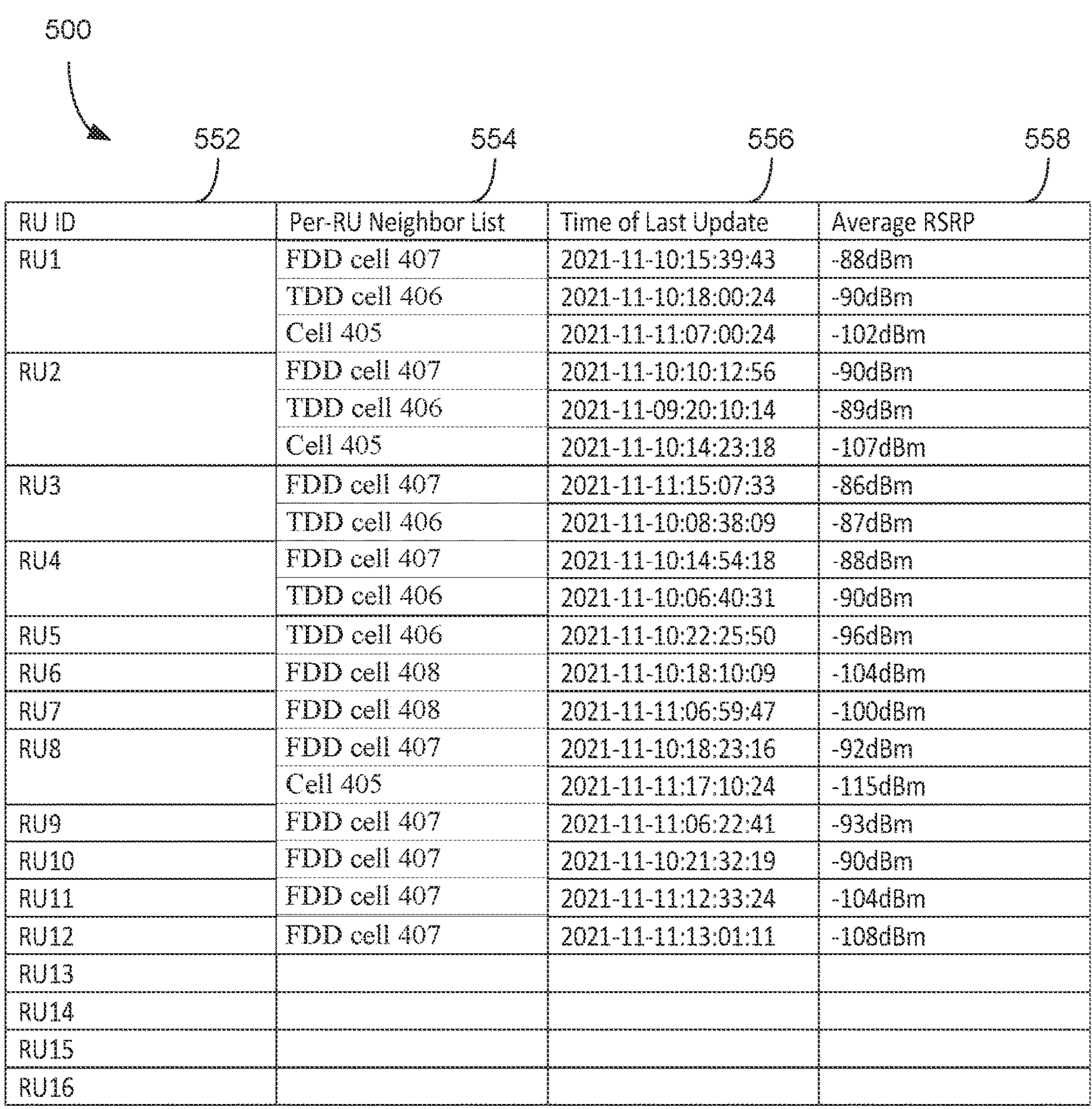
FIG. 5 depicts a table of an exemplary per-RU neighbor list with reference to the wireless system of FIG. 4.

To address the adversities resulting from handover reporting by the user equipment, the per-RU neighbor list described herein can reduce the impact to user equipment when triggering or completing handover and improve overall efficiency in the wireless system. FIG. 5 depicts a table of an exemplary per-RU neighbor list with reference to the wireless system of FIG. 4, which will be referenced for pedagogical explanation. Similar to table 300, table 500 includes a list of the radio units (column 552) serving TDD cells 406 and FDD cells 407, 408 managed by the base station 404, the associated neighbor cells for each radio unit (column 554), the time of last update (column 556), and the average RSRP (column 558). As shown in FIG. 4, TDD cell 406 includes RU 1, RU 2, RU 3, RU 4, RU 8, RU 9, and RU 10. Among those radio units, RU 1, RU 2, RU 3, and RU 4 are collocated with radio modules in FDD cell 407, while RU 8, RU 9, and RU 10 are noncollocated. FDD cell 407 also includes RU 5, RU 6, and RU 7. FDD cell 408 includes RU 11, RU 12, RU 13, RU 14, RU 15, and RU 16.

User equipment having RU 1, RU 2, RU 3, or RU 4 as their primary serving radio unit will report signal power measurements for TDD cell 406 and FDD cell 407 above a signal power threshold value, and so both TDD cell 406 and FDD cell 407 will be associated with RU 1, RU 2, RU 3, and RU 4 as shown in table 500. Unlike wireless system 200B, however, wireless system 400 includes an additional cell 405, which is close in proximity to portions of TDD cell 406 and FDD 407. A user equipment with RU 1 as the primary serving radio unit will report a signal power measurement for cell 405 that, although weaker than the signal power measurements for TDD cell 406 and FDD cell 407, still exceeds a signal power threshold. In addition to those cells, cell 405 will also be associated with RU 1 as a neighboring cell. Since RU 2 is also located sufficiently close to cell 405, depending on the signal strength threshold, a user equipment with RU 2 as the primary serving radio unit may also report signal power measurements corresponding to cell 405 above a signal power threshold value. As shown in table 500, although the signal power for cell 405 is weaker for RU 2 than RU 1 (the signal power for RU 1 is measured at −102 dBm while the signal power for RU 2 is measured at −107 dBm), cell 405 is associated as a neighboring cell to RU 2 as well as RU 1. However, since RU 3 and RU 4 are located farther away from cell 405, cell 405 is not associated with a neighboring cell to RU 3 and RU 4, as any signal power measurements would not exceed the threshold value.

RU 5 is not located within the coverage of TDD cell 406 and only has a radio module within FDD cell 407. Hence, only user equipment that are connected to the FDD cell 407 can have RU 5 as a primary serving radio unit. For any user equipment with RU 5 as a primary serving radio unit, the signal power measurement corresponding to TDD cell 406 will be of sufficient strength so that the user equipment will report signal power measurements for TDD cell 406. Thus, TDD cell 406 will be associated as a neighbor cell for RU 5. As shown in table 500, RU 5 includes only one neighbor cell, which is the TDD cell 406.

Although RU 6 and RU 7 are located in FDD cell 407, they are located far from TDD cell 406. Therefore, the signal power of FDD cell 407 will not be above the signal power threshold for the distributed unit to list cell TDD cell 406 as a neighbor cell for either RU 6 or RU 7. And since RU 6 and RU 7 are not collocated with TDD cell 406, there will not be a sufficient signal power for the FDD cell 407 to be associated as a neighboring cell. However, the location of RU 6 and RU 7 within FDD cell 407 are close enough to FDD cell 408 so that the signal power measurements for FDD cell 408 are above the signal power threshold, and so FDD cell 408 will be listed as a neighbor cell for RU 6 and RU 7, as shown in table 500.

Similar to table 300, RU 8, RU 9, and RU 10 are located in TDD cell 406 only and do not have collocated radio modules in FDD cell 407. Accordingly, user equipment connected on TDD cell 406 may have RU 8, RU 9, or RU 10 as their primary serving radio unit. For RU 9 and RU 10, only signal power measurements from FDD cell 407 will exceed the signal power measurement threshold for their user equipment, and so only FDD cell 407 will be a neighboring cell for these radio units as shown in table 500. While RU 8 will also have FDD cell 407 as a neighboring cell, RU 8 may be located close enough to cell 405 so that the reported signal power measurements exceed the signal power threshold. In this case, cell 405 is also listed as a neighboring cell for RU 8 as shown in table 500.

RU 11 and RU 12 are located within FDD cell 408 and are proximate to potential neighboring FDD cell 407 relative to RU 13, RU 14, RU 15, and RU 16 that are also located within cell 408. User equipment with RU 11 or RU 12 as their primary serving radio unit will determine signal power measurements corresponding to FDD cell 407 that exceed the signal power threshold. Accordingly, FDD cell 407 is listed as a neighboring cell for RU 11 and RU 12 as shown in table 500. However, since RU 13-RU 16 are located farther from FDD cell 407, the signal power measurements corresponding to FDD cell 407 will be too weak for user equipment with these radio units as their primary serving radio units, and so FDD cell 407 is not listed as a neighbor cell for these radio units in table 500. Rather, RU 13-RU 16 will not have any neighboring cells because none of the cells depicted in FIG. 4 are close enough to report signal power measurements that will exceed the signal power threshold.

In one example, the network element (an eNB/gNB, for example) managing the managed cell(s) for which table 500 is generated configures the user equipment serviced by a respective radio unit in the list to report the signal power measurements of the neighbor cells that: (1) are associated with the primary serving radio unit for the user equipment; and (2) have an average RSRP greater than or equal to a signal power threshold for handover.

It should be noted that the neighboring cells associated with a given radio unit used for handover will depend on the sensitivity of the handover signal power threshold (HOThreshold) used to filter candidate neighbor cells for measurement. For example, if the HOThreshold is set to a value of −116 dBm, then cell 405 can be designated as a handover candidate for user equipment that is served by RU 8. However, if the HOThreshold is set to a value of −110 dBm, then cell 405 would not be a handover candidate for user equipment served by RU 8. In contrast, a HOThreshold of −110 dBm would make cell 405 a candidate for handover for user equipment served by RU1, since the signal power measurements for RU1 is greater than the HOThreshold.

Cell deployment changes, such as new cell additions, radio unit additions, transmission power adjustments, and the like can be dynamically updated in the per-RU list. The per-RU list can be saved and used immediately after a restart of the wireless system or its managing entities.

Also, for a standalone (SA) 5G deployment, a gNB supports inter-RAT handover from 5G to LTE, and supports the evolved packet system (EPS) fallback of normal IMS voice call as well as for IMS emergency calls, for reasons including lack of 5G coverage, 5G user equipment yet to support voice over new radio (VoNR), and other reasons. For voice/emergency call EPS Fallback the IP Multimedia Subsystem (IMS) session initiated protocol (SIP) signaling between the IMS and user equipment is carried on a 5G network, and the call fallback from 5G to LTE is triggered when the gNB receives a request to setup the voice bearer. The EPS fallback can be accomplished by an inter-RAT handover from a 5G network to a 4G network, or by releasing the 5G connection and redirecting the user equipment to an LTE network. In either case, the gNB typically selects the LTE cell with the strongest signal for the user equipment for the fallback. However, the best neighbor at the 5G cell-level may not be the best for the user equipment at its location, and the user equipment may accordingly experience longer latency during the EPS fallback or even experience connection drop as a result. In contrast, utilizing the per-RU neighbor list enables the gNB to select the strongest LTE neighbor, or neighbors whose signal measurement is higher than an interRAT-HOThreshold from the neighbor list of the user equipment's primary serving radio unit, and thereby triggers EPS fallback to this LTE neighbor.

Figure 6:
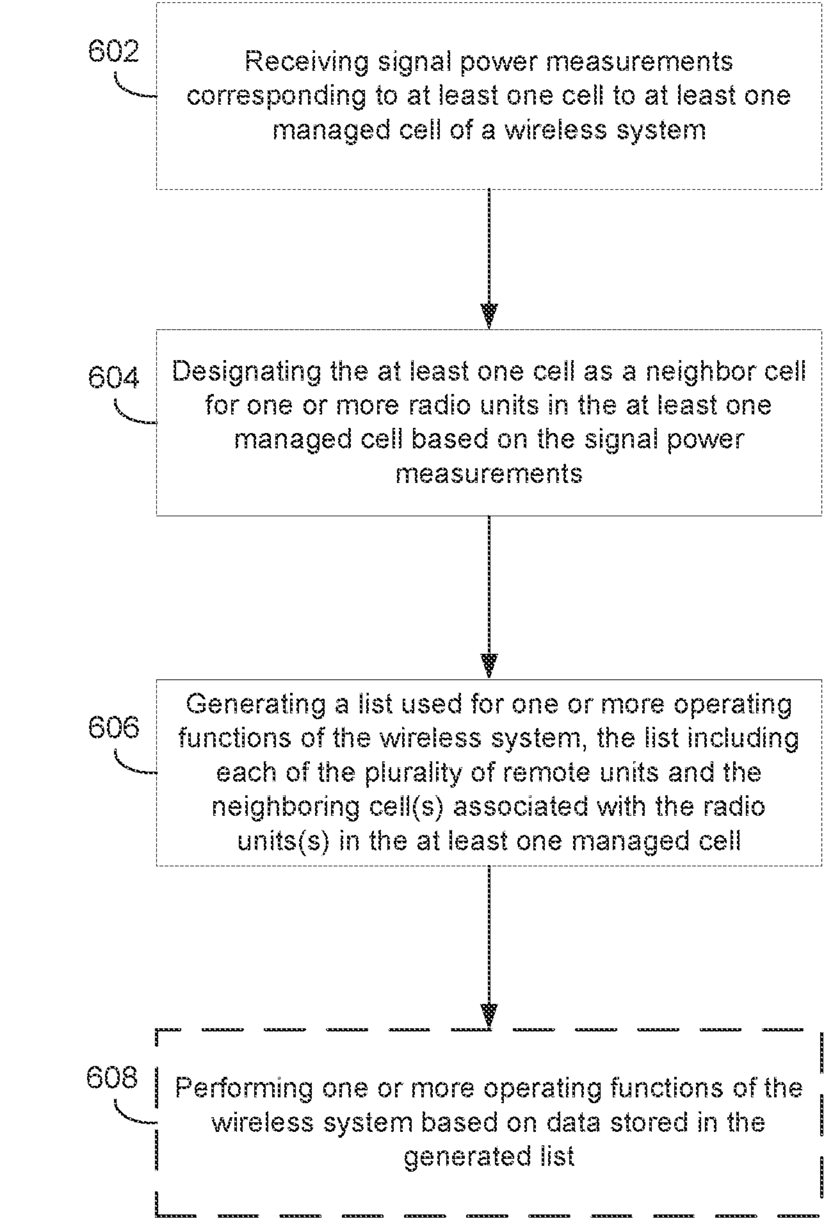
FIG. 6 depicts a flow diagram of an exemplary method for generating a per-RU list.

FIG. 6 depicts a flow diagram of an exemplary method for operating a wireless system that includes generating a per-RU list. Method 600 may be implemented via the techniques described with respect to FIGS. 1-5, but may be implemented via other techniques as well. The blocks of the flow diagram have been arranged in a generally sequential manner for ease of explanation; however, it is to be understood that this arrangement is merely exemplary, and it should be recognized that the processing associated with the methods described herein (and the blocks shown in the Figures) may occur in a different order (for example, where at least some of the processing associated with the blocks is performed in parallel and/or in an event-driven manner).

Method 600 includes receiving signal power measurements corresponding to at least one cell to a managed cell(s) of a wireless system (block 602). The signal power measurements are transmitted from user equipment to the primary serving radio unit for the user equipment and ultimately received by a baseband unit entity. The signal power measurements include a signal power of the at least one cell. Method 600 can be executed for each radio unit in the managed cell(s). For example, method 600 can be executed by periodically selecting random user equipment to measure and report intra-/inter-frequency, inter-RAT neighbor cells. Since different user equipment may have different radio units as their primary serving radio unit, after a suitable sample size there will be signal power measurements that correspond to each radio unit in the managed cell. For user equipment that have the same radio unit as the primary serving radio unit, the signal power measurements for each of the user equipment can be averaged.

In some examples, the wireless system can include the similar features to those described with respect to FIGS. 1, 3, and 5. For example, the base station can determine a signal power threshold used for a measurement event to be reported from user equipment. When the base station configures the user equipment to measure the signal power of one or more cells, the user equipment is configured to determine whether the signal power of the one or more cells exceeds the signal power threshold. For any cells whose corresponding signal power measurements exceed the signal power threshold, the user equipment is configured to send the signal power measurements to the base station.

Method 600 proceeds to designating at least one of the cell(s) as a neighboring cell for one or more radio units in the managed cell(s) based on the signal power measurements (block 604). For example, when the baseband entity receives signal power measurements exceeding a first threshold (a signal power threshold) from a user equipment with a radio unit as the primary serving radio unit, the baseband entity designates the cell associated with the signal power measurements as a neighbor cell for that radio unit. For multiple radio units deployed in the managed cell(s), the baseband entity can receive signal power measurements from the user equipment served by each different radio units and designate the cells associated with the signal power measurements as neighboring cells for each respective radio unit. Accordingly, the designated neighboring cell may correspond to one radio unit in the managed cell(s) but may not be a neighbor cell for another radio unit in the managed cell(s). For example, when one radio unit is located in a region of the managed cell(s) that is much closer to a cell than another radio unit located within the managed cell(s) that is farther away from the cell, the cell is more likely to be designated as a neighboring cell to the closer radio unit since the signal power measurements associated with the closer radio unit will likely be greater than the signal power measurements associated with the radio unit located further away from the cell.

Method 600 then proceeds to block 606 to generate a list including each of the plurality of radio units and the neighboring cell(s) associated with the one or more radio units of the plurality of radio units in the managed cell(s). Depending on the radio unit in the managed cell(s), the radio unit may have multiple neighboring cells associated with the radio unit (that is, cells that were designated as neighbor cells). Also, when a neighbor cell has not been updated for a period of time (for example, due to inoperability of the neighbor cell) or when a radio unit has been removed from deployment, the neighbor cell (and the radio unit entry in the list that is linked with the neighbor cell) is removed.

In some examples, the list includes other parameters. For example, the list may include the signal power measurement last reported for the neighbor cell that was associated with the radio unit. In another example, the list includes the time in which the signal power measurement was reported. Other parameters can be included as well.

Figure 7:
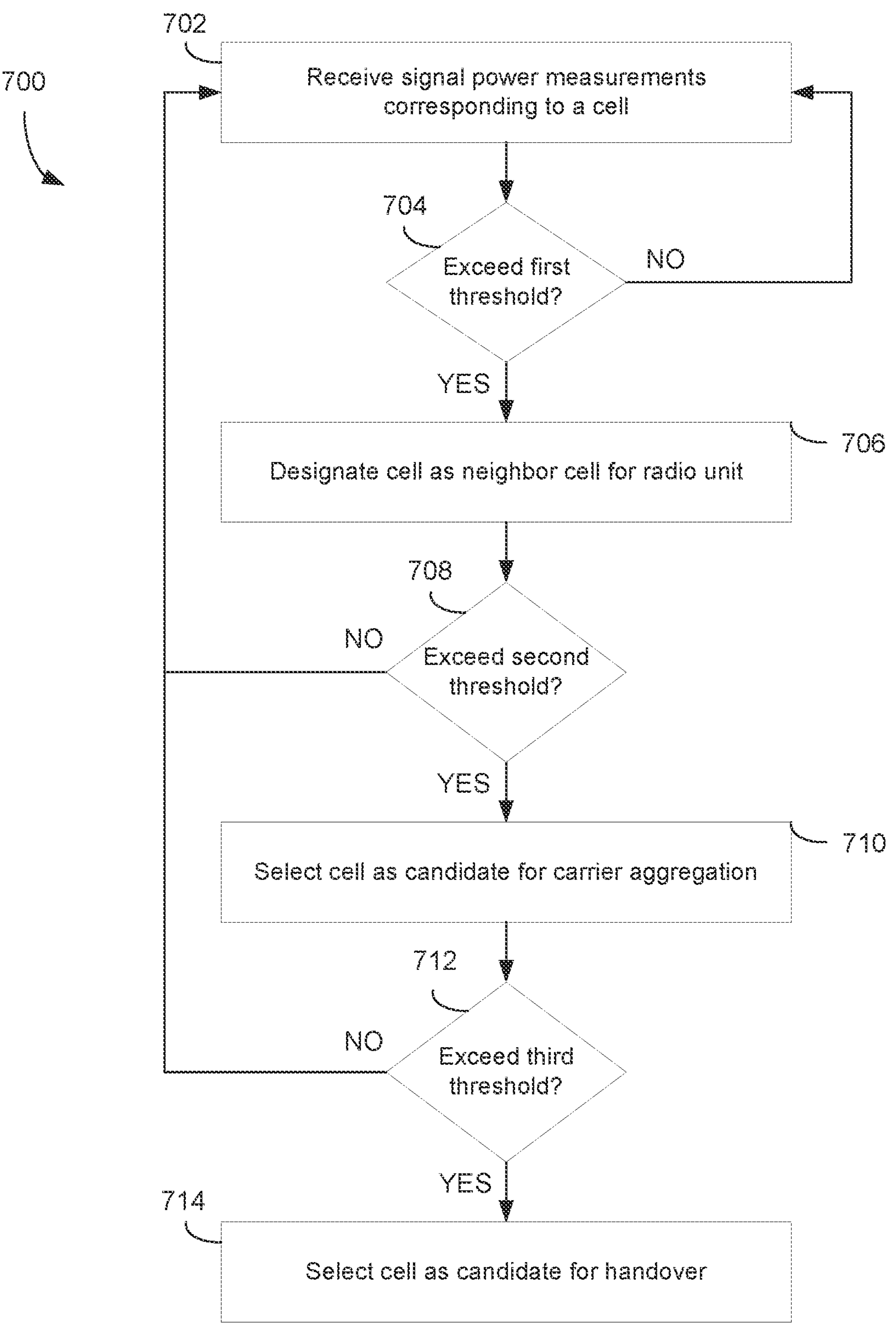
FIG. 7 depicts a flow diagram of an exemplary method for using a neighbor cell list to perform functions of the wireless system.

Method 600 optionally proceeds to block 608 to perform one or more operating functions of the wireless system based on data stored in the list. One example of a method to perform one or more operating functions of the wireless system is illustrated in FIG. 7, which can be used to perform the methodology of block 608. Method 700 can be repeated for each radio unit in the managed cell. Method 700 includes receiving signal power measurements corresponding to a cell (measured by user equipment that is being served by a radio unit) at block 702. If the signal power measurements exceed a first threshold (block 704), then at block 706, the cell is designated as a neighbor cell for that respective radio unit. Otherwise, method 700 reverts back to block 702 to receive signal power measurements for another radio unit, or the same radio unit with a different cell, or the same radio unit with the same cell at a later time.

In some examples, the generated list is used for carrier aggregation, for example, to determine whether a cell can be used as a secondary component carrier for a frequency band serviced by a respective radio unit in the managed cell(s). In this context, a second threshold (a CAThreshold) can be set and the signal power measurements of each of the neighbor cells in the list can be compared to the CAThreshold (block 708). If the signal power measurements for a neighbor cell exceed the CAThreshold, then that cell can be used for carrier aggregation for user equipment served by the radio unit associated with the neighbor cell (block 710). If the signal power measurements do not exceed the CAThreshold, the neighbor cell will not be a candidate for carrier aggregation, but can still be associated with one or more radio units in the list so long as the signal power measurements exceed the first threshold used to designate the cell as a neighbor cell. Doing so improves the carrier aggregation process by selecting secondary component carriers that are compatible with radio units and by reducing the time and burden for user equipment to measure and report the signal power for potential secondary component carriers.

In some examples, the generated list is used for handover of user equipment in the managed cell(s). In this context, a third threshold (a HOThreshold) can be set and the signal power measurements of each of the neighbor cells in the list can be compared to the HOThreshold (block 712). If the signal power measurements for a neighbor cell exceed the HOThreshold, then the cell can be used for handover for user equipment served by the radio unit associated with the neighbor cell (block 714). If the signal power measurements do not exceed the HOThreshold, the neighbor cell will not be a candidate for handover, but can still be associated with one or more radio units in the list so long as the signal power measurements exceed the first threshold used to designate the cell as a neighbor cell. Utilizing a per-RU neighbor list enables the CU to coordinate handover in the wireless system with reduced time and burden put on the user equipment to measure and report the signal power for potential neighboring cells. Additionally, the list can be maintained while the wireless system is in operation and periodically updated with new neighboring cells due to changes within the managed cell(s) (such as by adding or removing radio units or by changing the location of radio units within the cell) or potential neighboring cells (such as when new cells are deployed or removed near the managed cell(s)). The list can be used for other functions as well.

For example, the per-RU list can be used to determine the cell coverage view for cells in the wireless system. The per-RU list indicates whether the RF coverage across an FDD or TDD cell is suitably strong and consistent across the cell coverage, and can indicate whether FDD and TDD cells in the wireless system have comparable signal strength. Referring to FIG. 2B, the coverage of the wireless system 200B can be determined based on the generated RU list in table 300. As the RUs that comprise the TDD hotspot (RU1-RU4, RU8-RU10) are all associated with FDD cell 214 in table 300, it can be determined that the TDD hotspot is located in the area covered by these RUs and is overlapping with a corresponding coverage area of the FDD cell 214 (since RU1-RU4 comprising the FDD hotspot equivalent are all associated with TDD cell 212 in table 300). Any coverage disparities between two partially overlapping cells can also be determined. In wireless system 200B, the TDD signal strength corresponding to RU5 is much weaker than RU1-RU4, thus indicating that there is little to no TDD coverage where RU 6 and RU 7 are located.

As present from the disclosed embodiments, the per-RU list enables faster operation of the wireless system. When used for carrier aggregation (for cells that are both fully or partially overlapping), intra-/inter-frequency handover, inter-RAT handover and IMS Voice and/Emergency call EPS Fallback, the per-RU list enables improved measurement event monitoring by user equipment, thereby resulting in a reduction of the average measurement event reporting time, reduced impact to user equipment throughput, reduced RRC signaling, and improved spectrum efficiency. When used for handover and EPS Fallback, the per-RU list enables baseband entities to select target cells best suitable for a user equipment at the location of the user equipment, to reduce the number of neighbor cells for the user equipment to measure, and thereby results in faster handover, EPS Fallback execution time and improves the user equipment handover and EPS Fallback success rate. Additionally, correlating neighbor cells to radio units within a cell instead of the cell as a whole enables enhanced detection of network faults, such as connection drop and handover success/failure rate at the radio unit level. The per-RU connection and handover success/failure key performance indicators (KPIs) can pinpoint potential handover failures within a cell coverage. That is, the per-RU list can enable fine tuning of RF coverage areas and facilitate RF troubleshooting through handover failure KPIs at the RU level instead of the cell level.

The methods and techniques described herein may be implemented in digital electronic circuitry, or with a programmable processor (for example, a special-purpose processor or a general-purpose processor such as a computer) firmware, software, or in various combinations of each. Apparatus embodying these techniques may include appropriate input and output devices, a programmable processor, and a storage medium tangibly embodying program instructions for execution by the programmable processor. A process embodying these techniques may be performed by a programmable processor executing a program of instructions to perform desired functions by operating on input data and generating appropriate output. The techniques may advantageously be implemented in one or more programs that are executable on a programmable system including at least one programmable processor coupled to receive data and instructions from, and to transmit data and instruction to, a data storage system, at least one input device, and at least one output device. Generally, a processor will receive instructions and data from a read-only memory and/or a random-access memory. Storage devices suitable for tangibly embodying computer program instructions and data include all forma of non-volatile memory, including by way of example semiconductor memory devices, such as erasable programmable read-only memory (EPROM), electrically-erasable programmable read-only memory (EEPROM), and flash memory devices; magnetic disks such as internal hard disks and removable disks; magneto-optical disks; and digital video disks (DVDs). Any of the foregoing may be supplemented by, or incorporated in, specially-designed application-specific integrated circuits (ASICs).

Example Embodiments

Example 1 includes a method for operating a wireless system, the wireless system including a baseband unit entity communicatively coupled to a plurality of radio units, the plurality of radio units configured to provide wireless service to user equipment located in at least one managed cell configured to be managed by the baseband unit entity, comprising: receiving signal power measurements corresponding to at least one cell, wherein the signal power measurements include a signal power of the at least one cell and are associated with one or more radio units of the plurality of radio units; designating the at least one cell as a neighbor cell for each of the one or more radio units of the plurality of radio units in the at least one managed cell based on the signal power measurements; generating a list including each of the plurality of radio units and the neighbor cell associated with the one or more radio units of the plurality of radio units in the at least one managed cell; and performing one or more operating functions of the wireless system based on the generated list.

Example 2 includes the method of Example 1, further comprising determining one or more secondary component carriers (SCCs) based on the generated list; and wherein performing one or more operating functions of the wireless system based on the generated list comprises performing carrier aggregation with the one or more SCCs.

Example 3 includes the method of any of Examples 1-2, further comprising designating the neighbor cell for each of the one or more radio units of the plurality of radio units as a handover cell for the user equipment being serviced by the one or more radio units; and wherein performing one or more operating functions of the wireless system based on the generated list comprises associating the user equipment from the at least one managed cell to the handover cell and performing at least one of: an inter-radio access technology (RAT) handover process, or an evolved packet system (EPS) fallback process with the handover cell.

Example 4 includes the method of any of Examples 1-3, wherein designating the at least one cell as a neighbor cell for each of the one or more radio units of the plurality of radio units in the at least one managed cell based on the signal power measurements comprises determining that the signal power measurements exceed a signal power threshold value.

Example 5 includes the method of any of Examples 1-4, comprising determining an average reference signal received power (RSRP), reference signal received quality (RSRQ), or signal-to-interference-plus-noise ratio (SINR) from signal power measurements received from the user equipment serviced by the one or more radio units of the plurality of radio units.

Example 6 includes the method of any of Examples 1-5, further comprising configuring the user equipment being serviced by the one or more radio units to report signal power measurements for the neighbor cell.

Example 7 includes the method of any of Examples 1-6, wherein the generated list includes the signal power measurements corresponding to each neighbor cell associated with the one or more radio units of the plurality of radio units and/or a time in which the signal power measurements were reported by the user equipment.

Example 8 includes a program product comprising a non-transitory processor-readable medium on which program instructions configured to be executed by at least one processor are embodied, wherein when executed by the at least one processor, the program instructions cause the at least one processor to: receive signal power measurements corresponding to at least one cell, wherein the signal power measurements include a signal power of the at least one cell and are associated with one or more radio units of a plurality of radio units in at least one managed cell of a wireless system; designate the at least one cell as a neighbor cell for each of the one or more radio units of a plurality of radio units in the at least one managed cell based on the signal power measurements; generate a list including each of the plurality of radio units and the neighbor cell associated with the one or more radio units of the plurality of radio units in the at least one managed cell; and perform one or more operating functions of the wireless system based on the generated list.

Example 9 includes the program product of Example 8, wherein when executed by the at least one processor, the program instructions further cause the at least one processor to determine one or more secondary component carriers (SCCs) based on the generated list; and wherein to perform one or more operating functions of the wireless system based on the generated list comprises to perform carrier aggregation with the one or more SCCs.

Example 10 includes the program product of any of Examples 8-9, wherein, when executed by the at least one processor, the program instructions further cause the at least one processor to designate the neighbor cell for each of the one or more radio units of the plurality of radio units as a handover cell for user equipment being serviced by the one or more radio units; and wherein performing one or more operating functions of the wireless system based on the generated list comprises associating the user equipment from the at least one managed cell to the handover cell and performing at least one of: an inter-radio access technology (RAT) handover process, or an evolved packet system (EPS) fallback process with the handover cell.

Example 11 includes the program product of any of Examples 8-10, wherein to designate the at least one cell as a neighbor cell for each of the one or more radio units of the plurality of radio units in the managed cell based on the signal power measurements comprises to determine that the signal power measurements exceed a signal power threshold value.

Example 12 includes the program product of any of Examples 8-11, wherein, when executed by the at least one processor, the program instructions cause the at least one processor to determine an average reference signal received power (RSRP), reference signal received quality (RSRQ), or signal-to-interference-plus-noise ratio (SINR) from signal power measurements received from user equipment serviced by the one or more radio units of the plurality of radio units.

Example 13 includes the program product of any of Examples 8-12, wherein, when executed by the at least one processor, the program instructions cause the at least one processor to configure user equipment being serviced by the one or more radio units to report signal power measurements for the neighbor cell.

Example 14 includes the program product of any of Examples 8-13, wherein the generated list includes one or more of: the signal power measurements corresponding to each neighbor cell associated with the one or more radio units of the plurality of radio units, and/or a time in which the signal power measurements were reported by user equipment.

Example 15 includes a unit of a wireless system configured to provide wireless service to user equipment in at least one managed cell, the unit comprising: a network interface configured to receive wireless communication signals from a communication network; circuitry coupled to the network interface and configured to generate downlink signals from the wireless communication signals; a downlink interface coupled to the circuitry and configured to provide the downlink signals to a plurality of radio units communicatively coupled to the unit for transmission to the user equipment in the at least one managed cell; and at least one processor coupled to the downlink interface, wherein the at least one processor is configured to: receive signal power measurements corresponding to at least one cell, wherein the signal power measurements include a signal power of the at least one cell and are associated with one or more radio units of a plurality of radio units in the at least one managed cell; designate the at least one cell as a neighbor cell for each of the one or more radio units of the plurality of radio units in the at least one managed cell based on the signal power measurements; and generate a list including each of the plurality of radio units and the neighbor cell associated with the one or more radio units of the plurality of radio units in the at least one managed cell; and perform one or more operating functions of the wireless system based on the generated list.

Example 16 includes the unit of Example 15, wherein the unit is a central unit (CU) of a 5G wireless system.

Example 17 includes the unit of any of Examples 15-16, wherein the at least one managed cell and the neighbor cell are both managed by the unit.

Example 18 includes the unit of any of Examples 15-17, wherein the at least one processor is configured to: determine one or more secondary component carriers (SCCs) based on the generated list; and wherein to perform one or more operating functions of the wireless system based on the generated list comprises to perform carrier aggregation with the one or more SCCs.

Example 19 includes the unit of any of Examples 15-18, wherein the at least one processor is further configured to: designate the neighbor cell for each of the one or more radio units of the plurality of radio units as a handover cell for the user equipment being serviced by the one or more radio units; and wherein performing one or more operating functions of the wireless system based on the generated list comprises associating the user equipment from the at least one managed cell to the handover cell.

Example 20 includes the unit of any of Examples 15-19, wherein the generated list includes one or more of: the signal power measurements corresponding to each neighbor cell associated with the one or more radio units of the plurality of radio units, or a time in which the signal power measurements were reported by the user equipment.

The terms "about" or "substantially" mean that the value or parameter specified may be somewhat altered, as long as the alteration does not result in nonconformance of the process or structure to the illustrated embodiment from the perspective of one having ordinary skill in the art. The term "exemplary" merely indicates the accompanying description is used as an example, rather than implying an ideal, essential, or preferable feature of the illustrated embodiment.

Although specific embodiments have been illustrated and described herein, it will be appreciated by those of ordinary skill in the art that any arrangement, which is calculated to achieve the same purpose, may be substituted for the specific embodiments shown. Therefore, it is manifestly intended that this invention be limited only by the claims and the equivalents thereof.

What is claimed is:

1. A method for operating a wireless system, the wireless system including a baseband unit entity communicatively coupled to a plurality of radio units, the plurality of radio units configured to provide wireless service to user equipment located in at least one managed cell configured to be managed by the baseband unit entity, comprising:

at each of the plurality of radio units, receiving signal power measurements corresponding to at least one cell, wherein the signal power measurements include a signal power of the at least one cell and are associated with a radio unit of the plurality of radio units; and for each of the plurality of radio units, designating the at least one cell as a neighbor cell for the radio unit of the plurality of radio units in the at least one managed cell based on the signal power measurements;

generating a list including each of the plurality of radio units and each neighbor cell associated with the radio unit of the plurality of radio units in the at least one managed cell; and performing one or more operating functions of the wireless system based on the generated list.

2. The method of claim 1, further comprising determining one or more secondary component carriers (SCCs) based on the generated list; and wherein performing one or more operating functions of the wireless system based on the generated list comprises performing carrier aggregation with the one or more SCCs.

3. The method of claim 1, further comprising, for each of the plurality of radio units, designating a neighbor cell for the radio unit of the plurality of radio units as a handover cell for the user equipment being serviced by the one or more radio units; and wherein performing one or more operating functions of the wireless system based on the generated list comprises:

associating the user equipment from the at least one managed cell to the handover cell and performing at least one of: an inter-radio access technology (RAT) handover process, or an evolved packet system (EPS) fallback process with the handover cell.

4. The method of claim 1, wherein designating the at least one cell as a neighbor cell for the radio unit of the plurality of radio units in the at least one managed cell based on the signal power measurements comprises determining that the signal power measurements exceed a signal power threshold value.

5. The method of claim 1, wherein the signal power measurements comprise an average reference signal received power (RSRP), reference signal received quality (RSRQ), or signal-to-interference-plus-noise ratio (SINR) from signal power measurements received from the user equipment serviced by the one or more radio units of the plurality of radio units.

6. The method of claim 1, further comprising configuring the user equipment being serviced by the one or more radio units to report signal power measurements for the neighbor cell.

7. The method of claim 1, wherein the generated list includes the signal power measurements corresponding to each neighbor cell associated with a radio unit of the plurality of radio units and/or a time in which the signal power measurements were reported by the user equipment.

8. A program product comprising a non-transitory processor-readable medium on which program instructions configured to be executed by at least one processor are embodied, wherein when executed by the at least one processor, the program instructions cause the at least one processor to:

at each of the plurality of radio units, receive signal power measurements corresponding to at least one cell, wherein the signal power measurements include a signal power of the at least one cell and are associated with a radio unit of a plurality of radio units in at least one managed cell of a wireless system;

for each of the plurality of radio units, designate the at least one cell as a neighbor cell for the radio unit of a plurality of radio units in the at least one managed cell based on the signal power measurements;

generate a list including each of the plurality of radio units and each neighbor cell associated with the radio unit of the plurality of radio units in the at least one managed cell; and perform one or more operating functions of the wireless system based on the generated list.

9. The program product of claim 8, wherein when executed by the at least one processor, the program instructions further cause the at least one processor to determine one or more secondary component carriers (SCCs) based on the generated list; and wherein to perform one or more operating functions of the wireless system based on the generated list comprises to perform carrier aggregation with the one or more SCCs.

10. The program product of claim 8, wherein, when executed by the at least one processor, the program instructions further cause the at least one processor, for each of the plurality of radio units, to designate a neighbor cell for the radio unit of the plurality of radio unit as a handover cell for user equipment being serviced by the one or more radio units; and wherein performing one or more operating functions of the wireless system based on the generated list comprises:

associating the user equipment from the at least one managed cell to the handover cell and performing at least one of: an inter-radio access technology (RAT) handover process, or an evolved packet system (EPS) fallback process with the handover cell.

11. The program product of claim 8, wherein to designate the at least one cell as a neighbor cell for the radio unit of the plurality of radio units in the managed cell based on the signal power measurements comprises to determine that the signal power measurements exceed a signal power threshold value.

12. The program product of claim 8, wherein, wherein the signal power measurements comprise an average reference signal received power (RSRP), reference signal received quality (RSRQ), or signal-to-interference-plus-noise ratio (SINR) from signal power measurements received from user equipment serviced by the one or more radio units of the plurality of radio units.

13. The program product of claim 8, wherein, when executed by the at least one processor, the program instructions cause the at least one processor to configure user equipment being serviced by the one or more radio units to report signal power measurements for the neighbor cell.

14. The program product of claim 8, wherein the generated list includes one or more of: the signal power measurements corresponding to each neighbor cell associated with a radio unit of the plurality of radio units, and/or a time in which the signal power measurements were reported by user equipment.

15. A unit of a wireless system configured to provide wireless service to user equipment in at least one managed cell, the unit comprising:

a network interface configured to receive wireless communication signals from a communication network;

circuitry coupled to the network interface and configured to generate downlink signals from the wireless communication signals;

a downlink interface coupled to the circuitry and configured to provide the downlink signals to a plurality of radio units communicatively coupled to the unit for transmission to the user equipment in the at least one managed cell; and at least one processor coupled to the downlink interface, wherein the at least one processor is configured to:

at each of the plurality of radio units, receive signal power measurements corresponding to at least one cell, wherein the signal power measurements include a signal power of the at least one cell and are associated with a radio unit of a plurality of radio units in the at least one managed cell;

for each of the plurality of radio units, designate the at least one cell as a neighbor cell for the radio unit of the plurality of radio units in the at least one managed cell based on the signal power measurements; and generate a list including each of the plurality of radio units and each neighbor cell associated with the radio unit of the plurality of radio units in the at least one managed cell; and perform one or more operating functions of the wireless system based on the generated list.

16. The unit of claim 15, wherein the unit is a central unit (CU) of a 5G wireless system.

17. The unit of claim 15, wherein the at least one managed cell and the neighbor cell are both managed by the unit.

18. The unit of claim 15, wherein the at least one processor is configured to:

determine one or more secondary component carriers (SCCs) based on the generated list; and wherein to perform one or more operating functions of the wireless system based on the generated list comprises to perform carrier aggregation with the one or more SCCs.

19. The unit of claim 15, wherein the at least one processor is further configured to:

for each of the plurality of radio units, designate a neighbor cell for the radio unit of the plurality of radio units as a handover cell for the user equipment being serviced by the one or more radio units; and wherein performing one or more operating functions of the wireless system based on the generated list comprises associating the user equipment from the at least one managed cell to the handover cell.

20. The unit of claim 15, wherein the generated list includes one or more of: the signal power measurements corresponding to each neighbor cell associated with a radio unit of the plurality of radio units, or a time in which the signal power measurements were reported by the user equipment.

* * * * *